(12) United States Patent
Shaikh et al.

(10) Patent No.: US 7,954,311 B2
(45) Date of Patent: Jun. 7, 2011

(54) AMMONIA VAPOR MANAGEMENT SYSTEM AND METHOD

(75) Inventors: Furqan Shaikh, Troy, MI (US); Don Lawrence, Birmingham, MI (US); Scott Cooper, Ann Arbor, MI (US); Larry Castleberry, Jr., Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1081 days.

(21) Appl. No.: 11/724,806

(22) Filed: Mar. 15, 2007

(65) Prior Publication Data
US 2008/0223021 A1 Sep. 18, 2008

(51) Int. Cl.
*F01N 3/00* (2006.01)

(52) U.S. Cl. ............... 60/266; 60/274; 60/279; 60/295; 60/301; 60/303

(58) Field of Classification Search .................. 60/274, 60/286, 287, 291, 295, 301, 303, 278, 279
See application file for complete search history.

(56) References Cited

U.S. PATENT DOCUMENTS

| | | | |
|---|---|---|---|
| 3,657,878 A | 4/1972 | Kaufmann, Jr. | |
| 4,314,345 A | 2/1982 | Shiraishi et al. | |
| 4,334,756 A | 6/1982 | Michlin et al. | |
| 5,272,873 A | 12/1993 | Hamazaki | |
| 5,369,956 A | 12/1994 | Daudel et al. | |
| 5,522,218 A | 6/1996 | Lane et al. | |
| 5,544,483 A | 8/1996 | Heuer | |
| 5,605,042 A | 2/1997 | Heinz | |
| 5,809,774 A * | 9/1998 | Peter-Hoblyn et al. | 60/274 |
| 5,943,858 A | 8/1999 | Hofmann et al. | |
| 5,957,114 A | 9/1999 | Johnson et al. | |
| 6,301,879 B1 * | 10/2001 | Weisweiler et al. | 60/274 |
| 6,361,754 B1 * | 3/2002 | Peter-Hoblyn et al. | 423/213.2 |
| 6,387,041 B1 * | 5/2002 | Harari et al. | 600/30 |
| 6,387,336 B2 | 5/2002 | Marko et al. | |
| 6,470,673 B1 | 10/2002 | Van Nieuwstadt et al. | |
| 6,620,391 B2 | 9/2003 | Mueller et al. | |
| 6,637,196 B1 | 10/2003 | Tost | |
| 6,739,125 B1 * | 5/2004 | Mulligan | 60/286 |
| 7,213,397 B2 | 5/2007 | Hu et al. | |
| 7,726,118 B2 | 6/2010 | Oberski et al. | |

(Continued)

FOREIGN PATENT DOCUMENTS

EP 1669567 6/2006

(Continued)

OTHER PUBLICATIONS

Lambert et al., "Urea SCR and CDPF System for Diesel Sport Utility Vehicle," Meeting Tier 2 Bin 5, Presented in Coronado, California, Sep. 2, 2004, 8 pages.

*Primary Examiner* — Tu M Nguyen
(74) *Attorney, Agent, or Firm* — Julia Voutyras; Alleman Hall McCoy Russell & Tuttle LLP

(57) ABSTRACT

A method is described for managing vapors generated from an ammonia-containing reductant delivery system. The method may include generating ammonia vapors in a first storage device and storing said generated ammonia vapors in a second storage device. Further, the method may include purging the stored vapors from the second storage device to upstream of a combustion chamber of the engine during a first condition and downstream of the combustion chamber during a second condition.

17 Claims, 8 Drawing Sheets

U.S. PATENT DOCUMENTS

| | | |
|---|---|---|
| 7,770,384 B2 * | 8/2010 | Oberski et al. .................. 60/286 |
| 2003/0033799 A1 | 2/2003 | Scheying |
| 2004/0098976 A1 | 5/2004 | Van Nieuwstadt et al. |
| 2004/0258594 A1 | 12/2004 | Andreasson et al. |
| 2005/0129599 A1 | 6/2005 | Berriman et al. |
| 2005/0198943 A1 | 9/2005 | Breuer et al. |
| 2005/0247050 A1 | 11/2005 | Kaboord et al. |
| 2005/0282285 A1 | 12/2005 | Radhamohan et al. |
| 2006/0117741 A1 | 6/2006 | Mayer et al. |
| 2007/0036694 A1 | 2/2007 | Nishioka et al. |
| 2007/0051096 A1 | 3/2007 | Pfeifer et al. |
| 2007/0277505 A1 | 12/2007 | Dawson et al. |
| 2008/0066453 A1 * | 3/2008 | Oberski et al. .................. 60/286 |

FOREIGN PATENT DOCUMENTS

| | | |
|---|---|---|
| WO | 2004042207 A1 | 5/2004 |
| WO | 2006087553 A1 | 8/2006 |
| WO | WO 2006087553 A1 * | 8/2006 |

* cited by examiner

AMMONIA VAPOR MANAGEMENT SYSTEM AND METHOD

BACKGROUND AND SUMMARY

Ammonia or urea may be stored on-board a vehicle for use as a reductant in exhaust emission control systems.

Under some conditions, such as during ammonia or urea recharge, ammonia vapor that was generated in the reductant system may be used, such as described in U.S. Patent Publication No. 2006/0117741. For example, ammonia vapors may be routed to a storage unit and a reactor that uses catalytically generated heat from the exhaust or electrically generated heat. Further, the vapors may also be directed to the exhaust gas to react with exhaust gas NOx in a catalyst in the exhaust flow.

However, the inventors herein have recognized several issues with such a system. For example, ammonia vapors may be used inefficiently in the exhaust, such as during various SCR (selective catalyst reduction) catalyst temperature conditions.

Thus, in one approach, a method of managing vapors generated from an ammonia-containing reductant delivery system for an engine of a vehicle may be used. The method comprises storing ammonia containing vapors generated in the reductant delivery system and purging said stored ammonia into selected regions of the engine based on an operating temperature, such as temperatures of the regions.

Thus, the reductant may be directed to various regions of the engine based on operating conditions. For example, at relatively high operation temperatures, ammonia may reduce a first amount of NOx in the combustion chamber and then reduce residual NOx in a downstream SCR catalyst. In another example, at low operation temperatures, ammonia may be used to recharge a urea or ammonia storage device to be later released into the system. In this way, it may be possible to reduce vapor pressures and reduce un-metered ammonia exiting the system. Further, by later use of the stored ammonia in the exhaust, more effective usage rates of ammonia (or urea) may be achieved, possibly reducing the amount or frequency of ammonia (or urea) that is added by a user.

Further, in an example approach where stored ammonia or urea is purged into the engine combustion chamber, it is possible to reduce some amount of NOx prior to a downstream SCR catalyst. In this way, the combination of the combustion chamber and the SCR catalyst may increase the total amount of NOx reduced in the system. As such, the engine may run on leaner conditions to improve fuel efficiency.

Finally, in still another example approach where ammonia or urea is stored during a reductant filling and later purged (into engine, exhaust, or back to tank), it is possible to reduce evaporative emissions that may be released into the atmosphere during reductant refilling. As such, the operator may be subject to a reduced amount of bothersome ammonia vapors.

DETAILED DESCRIPTION OF THE DEPICTED EMBODIMENTS

The accompanying figures and this description depict and describe various exemplary embodiments of a system for managing the storage and purging of evaporative emissions, such as with regard to an on-board ammonia or urea storage and metering system. Some of the embodiments described herein include a first storage device for storing the reductant, as well as a metering system to deliver the stored reductant to the exhaust system upstream of a catalyst for the reduction of various engine emissions. Further, a second storage device may be included for capturing evaporative emissions from the first storage device to reduce release of evaporative emissions to the atmosphere. Under selected conditions, the second storage device may require purging. The evaporative emissions stored in second storage device may be purged to the first storage device to be dissolved into first reductant or may be purged into the system. For example, the evaporative emissions may be introduced to an SCR catalyst or may be introduced to the combustion chamber to reduce NOx based on thermal considerations or engine operating conditions. In this way, the system may take advantage of the engine operating conditions to effectively reduce NOx with the purged evaporative emissions and reduce release of the evaporative emissions from the first storage device.

Figure 1:
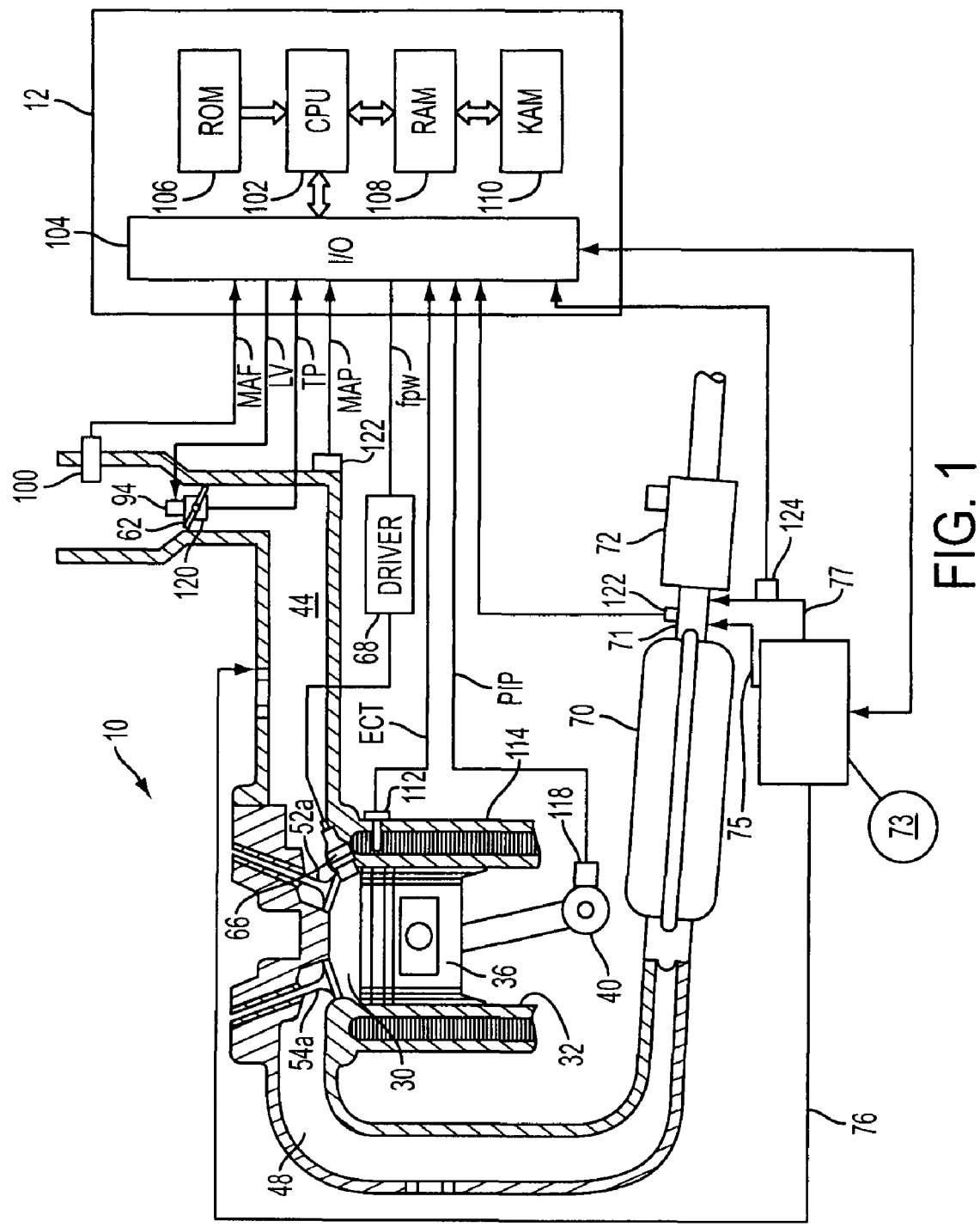
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52a, and exhaust valve 54a. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

A catalytic converter 70 is shown in communication with exhaust manifold 48, and a catalyst 72 is shown positioned downstream of catalytic converter 70. A reductant source 73 is provided for introducing one or more reductants into exhaust system 71 upstream of SCR catalyst 72 or into intake manifold 44 upstream of combustion chamber 30 or some combination thereof as prompted by controller 12. In particular, reductants may enter exhaust system 71 at various locations (e.g. first reductant input 75, second reductant input 77, etc.). Alternatively, reductants may enter intake manifold 44 via intake manifold input 76, for example.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); and throttle position TP from throttle position sensor 120. Controller 12 may also receive a signal related to an exhaust NOx concentration from a NOx sensor 122 positioned upstream of SCR catalyst 72, and/or a signal from an ammonia sensor 124 related to an ammonia concentration in a reductant added from reductant source 73. Engine speed signal RPM is generated by controller 12 from signal PIP in a conventional manner and manifold pressure signal MAP provides an indication of engine load.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc.

Figure 2:
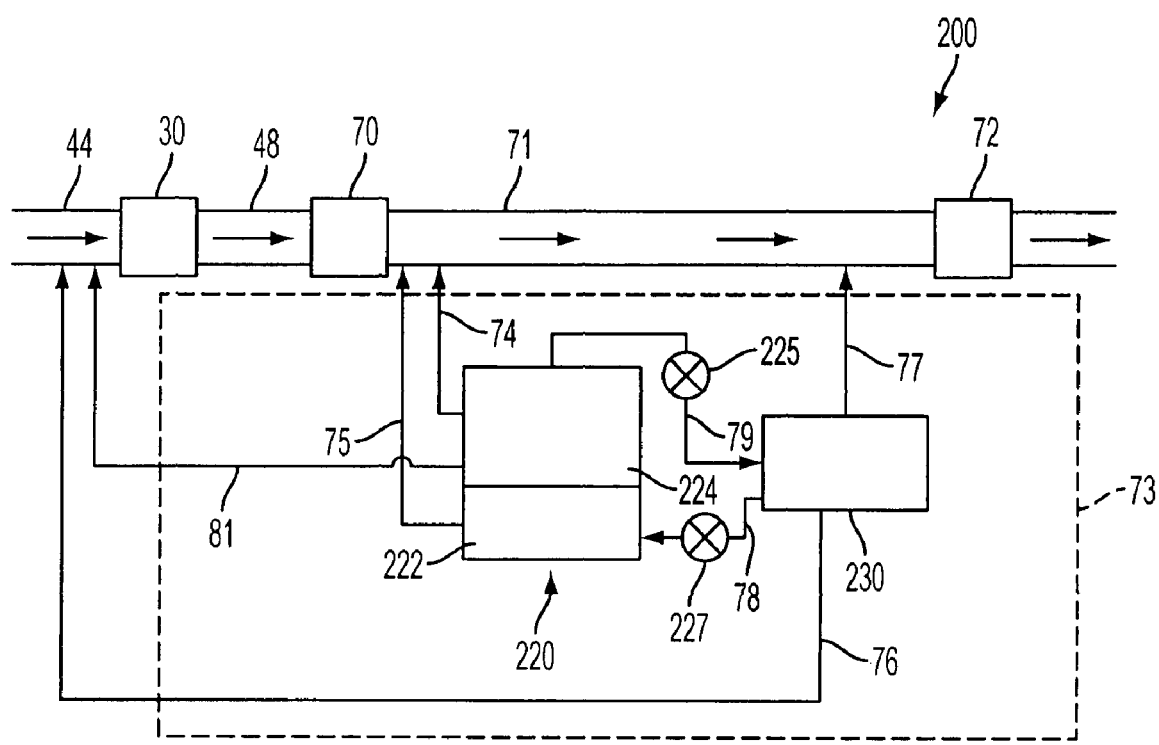
FIG. 2 shows an exemplary embodiment of a system for managing a plurality of reductants for use in a reduction process.

FIG. 2 shows a block diagram of an example of emissions control system 200 of engine 10 in more detail. In particular, combustion chamber 30 is shown communicating with intake manifold 44 and exhaust manifold 48 where the exhaust manifold is shown further communicating with catalytic converter 70. A catalyst 72, such as an SCR catalyst, may be coupled to the catalytic converter by exhaust system 71. Further, emissions control system 200 may include a reductant source 73 (e.g., a reductant storage, delivery, and purge management system) that may manage the storage and utilization of a plurality of reductants. While FIG. 2 shows one specific reductant management system, various alternatives may be used, such as alternatives shown by the examples described herein.

Reductant management system 73 is shown coupled to intake manifold 44 upstream of combustion chamber 30 and exhaust system 71 upstream of catalyst 72, such as an SCR catalyst. As such, reductant management system 73 may selectively introduce reductants (e.g., mixtures comprising ammonia and/or urea) to or upstream of combustion chamber 30 (e.g., via intake manifold 44) and/or downstream of combustion chamber 30 to exhaust system 71 (e.g., before SCR catalyst 72). In particular, one or more reductants may be introduced to intake manifold 44 via first intake input 76 or second intake input 77. Likewise, one or more reductants may be introduced to exhaust system 71 via first exhaust input 75, second exhaust input 77, third exhaust input 74, or some combination thereof.

Reductant management system 73 may include a first storage device 220 for storing a quantity of a first reductant 222. Depending upon the chemical and physical properties of first reductant 222, under certain conditions, first reductant 222 may react (for example, with atmospheric components) or decompose to form a second reductant 224.

Over time (e.g., during vehicle operation, during engine/vehicle shut-down, during reductant re-filling), the production of second reductant 224 may cause an increase in vapor pressure within first storage device 220. Therefore, to assist in controlling pressure within first storage device 220 or within system 73, at some vapor pressure a pressure relief valve 225 may be configured to release a quantity of second reductant 224 into a second storage device 230 via storage line 79, although second reductant 224 may be released directly into the exhaust stream through third exhaust input 74. Second storage device 230 likewise may be configured to release controlled quantities of second reductant 224 into exhaust system 71 through second exhaust input 77. Under some conditions, second storage device 230 may be configured to release controlled quantities of second reductant 224 into intake manifold 44 upstream of combustion chamber 30. Under other conditions, second reductant 224 may be released into the first storage device 220 via recycle line 78 wherein second reductant 224 may be dissolved in first reductant 222, for example. In this manner, reductant management system 73 may allow controlled quantities of both the first and second reductants to be released into exhaust system 71 wherein at least one of the reductants may react at a downstream site, such as an SCR catalyst, for example. Further the release may be concurrent, separate, or some combination thereof.

In some embodiments, first reductant 222 stored in first storage device 220 may be aqueous urea. First storage device 220 may include a storage tank for the example embodiment described herein, although other storage devices may also be used.

As noted above, the aqueous urea solution may react with various atmospheric components (e.g. water vapor, oxygen, etc.) under various conditions (e.g. applied heat, external heat, reduced atmospheric pressure, etc.), thereby decomposing and evolving ammonia vapor. Pressure relief valve 225 may be configured to open at a selected pressure, engine cycle or time interval, etc. to release at least some of the ammonia vapor from first storage device 220 into second storage device 230. For example, pressure relief valve 225 may be configured to open during engine/vehicle shut-down prior to filling the storage tank. Likewise, recycle valve 227 may be configured to open at a selected reductant concentration in storage device 230, for example. Second storage device 230 may capture and store the ammonia vapor so as to reduce ammonia release into the atmosphere during refilling of the tank, for example. Second storage device 230 may store the ammonia chemically, physically, or some combination thereof. The ammonia may be stored until controller 12 prompts the release of ammonia vapor from second storage device 230.

Second storage device 230 may contain any suitable sorbent material for the storage of ammonia. For example, second storage device 230 may include a low temperature storage zeolite washcoat on a ceramic substrate. In another example, second storage device 230 may be a charcoal canister. Other examples of suitable sorbent materials may include but are not limited to molecular sieves (e.g. zeolites, alumina, silica, activated carbon, etc); oxides, carbonates, and hydroxides of alkali earth metals; and metal phosphates including but not limited to phosphates of titanium and zirconium. In one example, the ammonia may be adsorbed to a surface via chemical adsorption, or may be chemically and physically absorbed into material in the storage unit.

In some embodiments, the concentration of ammonia in the gas passing through second storage unit 230 may drive the storage/release of ammonia. For example, when a higher concentration of ammonia at selected temperatures is passed through second storage device 230 from first storage device 220, ammonia may be stored. However, when fresh air is passed through second storage device 230, ammonia may be released. In this way, temporary storage may be used to enable venting of gasses and thereby reduce pressure in the system, where the temporarily stored ammonia may then be recovered and used in the system.

The system may use ammonia vapor recovered from second storage device 230 in a variety of ways. Under some conditions, ammonia vapor from second storage device 230 may be introduced to exhaust system 71. As such, ammonia may be absorbed in SCR catalyst 72 to reduce NOx in the exhaust. Alternatively, ammonia vapor from second storage device 230 may be introduced to intake manifold 44 upstream of or to combustion chamber 30. Under some conditions, ammonia introduced to intake manifold 44 may at least partially reduce NOx in combustion chamber 30 and/or exhaust manifold 48.

As such, ammonia may at least partially convert NOx in a portion of the system that may not include a catalyst, such as combustion chamber 30, and/or may reduce NOx selectively and catalytically in SCR catalyst 72 or some combination thereof.

Figure 3:
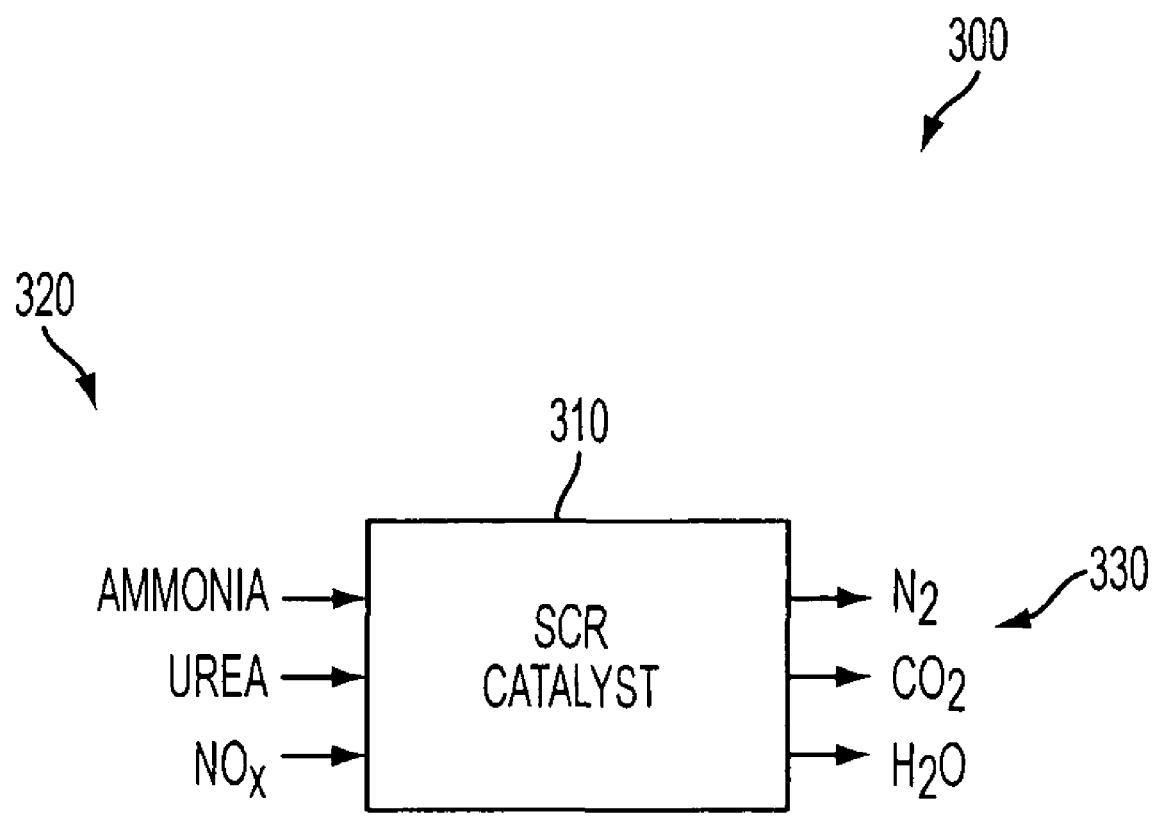
FIG. 3 shows a generalized schematic of the reduction of nitrogen oxides by ammonia and urea in reduction process.

FIG. 3 schematically illustrates the conversion of nitrogen oxides by ammonia and/or urea in an example of a reduction process 300. Arrows pointing to box 310 represent chemical reagents 320 while arrows pointing from box 310 represent products 330. Nitrogen oxides in the reacting with ammonia and/or urea may form more environmentally benign products such as nitrogen, carbon dioxide, and water for emission into the atmosphere. In some embodiments, ammonia and/or urea may selectively and catalytically react in SCR catalyst 72. In other embodiments, ammonia and/or urea may react in a mechanism that may not include a catalyst, such as in thermal decomposition, for example. Some exemplary reactions are as follows.

First, urea may decompose into ammonia as follows:

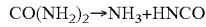
$$CO(NH_2)_2 \rightarrow NH_3 + HNCO$$

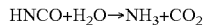
$$HNCO + H_2O \rightarrow NH_3 + CO_2$$

Ammonia may, in turn, react with NOx according to various different reaction pathways, including but not limited to one or more of the following:

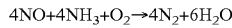
$$4NO + 4NH_3 + O_2 \rightarrow 4N_2 + 6H_2O$$

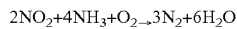
$$2NO_2 + 4NH_3 + O_2 \rightarrow 3N_2 + 6H_2O$$

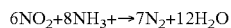
$$6NO_2 + 8NH_3 + \rightarrow 7N_2 + 12H_2O$$

$$NO + NO_2 + 2NH_3 \rightarrow 2N_2 + 3H_2O$$

It may be desirable to introduce an amount of one or more reductants, such as urea and/or ammonia, generally derived from the above NOx reduction reaction stoichiometries or a look-up table stored in controller 12. In particular, the amount of urea and/or ammonia introduced may be based on information from a sensor. For example, the output signal from a sensor, such as a NOx sensor, may indicate an amount of NOx in some region of the system. In another example, the output signal from a sensor in the reductant management system, such as an ammonia sensor, may indicate an amount of ammonia that may be purged from second storage device 230. As such, controller 12 may prompt reductant management system 73 to introduce an amount of urea and/or ammonia to exhaust system 71 accordingly. In doing this, urea and/or ammonia may be substantially consumed by the reduction of NOx in the exhaust at the SCR catalyst.

However, under some conditions it may be advantageous to mitigate ammonia release into the environment. In particular, ammonia release may occur during refill of the storage tank. Reductant management system 73 may regulate the reductants such that ammonia may be substantially contained in second storage device 230 rather than escape through the neck of the storage tank. By doing this, release of ammonia may be reduced.

Figure 4:
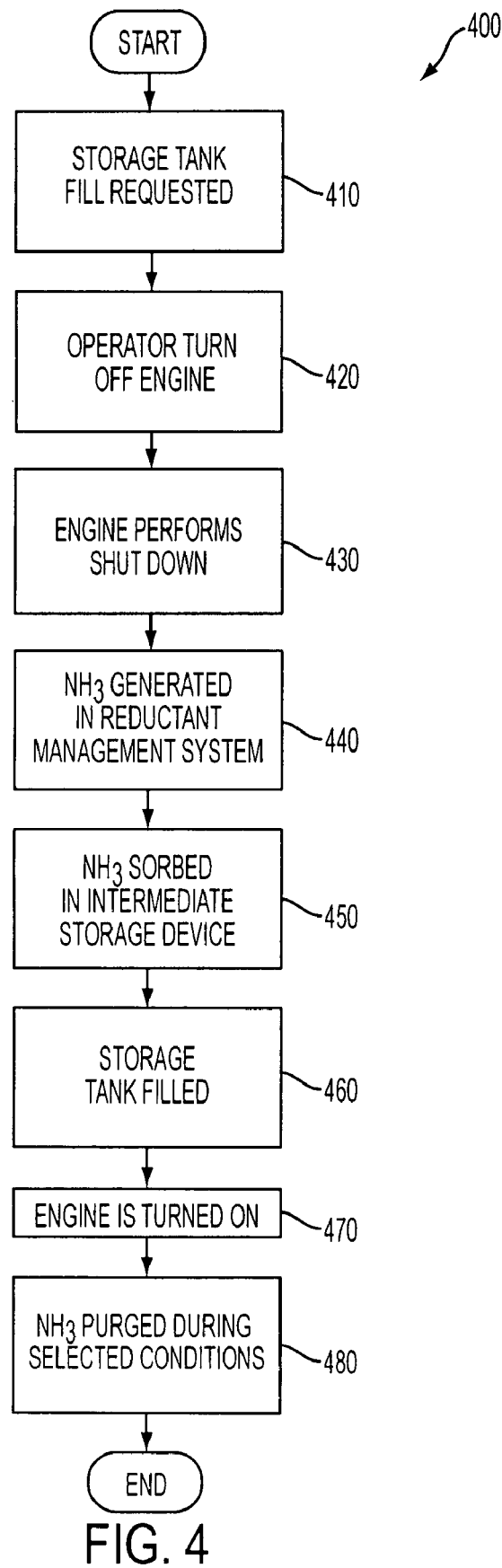
FIG. 4 is an embodiment of a method for operating an emission control system based on the operation state of the engine.

FIG. 4 illustrates an embodiment of a sequence of operations that may be used to reduce the release of evaporative emissions from a urea storage tank. In particular, the storage and transport of a reductant, such as urea and/or ammonia, may be regulated by a method of operating reductant management system 73 that may be at least partially contingent on various engine conditions, and in particular based on engine shut-down and/or reductant refilling conditions. While ammonia may be generated during normal engine operation, the amount of NOx generated by the engine may be sufficient to substantially consume ammonia generated. However, during engine shut-down conditions, a reduced amount of NOx may be generated by the engine such that ammonia may be released into the atmosphere. As such, the method described herein may be used to reduce evaporative emissions released during an engine shut-down prompted by an output signal requesting a urea tank refill. For example, during engine-off conditions (which may include vehicle-off conditions, or vehicle operational conditions in the example of a hybrid-electric vehicle), ammonia may be released into the environment from the storage tank prior to, during, and/or after refilling the reductant tank. Although FIG. 4 illustrates a sequence of operations for engine-off conditions, it may be understood that the method described herein may be used during various other engine conditions, such as during normal engine operation.

The example routine 400 illustrated in FIG. 4 shows a schematic representation of an example embodiment of emission control system operation that may manage ammonia in emission control system 200 to address ammonia generation during engine-off conditions, such as during a tank refill. For example, ammonia may be generated due to external heat transferred to the ammonia/urea storage system. In one example, residual engine/exhaust heat in combination with ambient heat may cause production of ammonia vapor that raises vapor pressure. Such conditions may be addressed by storing vapor during the engine-off conditions to be later introduced in the intake manifold and/or the exhaust for emission reduction.

First, at 410 a reductant refill in the storage tank may be requested. In particular, an output signal from a sensor in the storage tank may indicate that a reductant refill may be desired to sustain suitable emission control. As such, an indicator light, for example, in the control panel of the vehicle may prompt the vehicle operator to turn the engine off so as to refill the storage tank at 420. As such, at 430 the engine performs a shut-down wherein the shut-down may initiate a condition that may be referred to herein as engine-off condition. In one embodiment, the engine may be a combustion engine in a vehicle wherein the vehicle may be shut-down during the engine-off conditions. In another embodiment, the vehicle may use an electric motor or various other drive members (e.g. a fuel cell, etc.) during the engine-off condition of the combustion engine.

During the engine-off condition of the combustion engine, ammonia may be generated at 440 in the reductant management system in various ways. In particular, the urea may react with water and/or oxygen in the storage tank to produce ammonia at ambient temperature. Further, heat may facilitate the decomposition of urea to ammonia. As such, residual heat from previous operation of the engine may at least partially accelerate ammonia generation in the storage tank.

Referring back to FIG. 2, the reaction of stored urea may lead to elevated pressures of ammonia gas in first storage device 220 wherein first storage device 220 may be a urea storage tank. Pressure in the storage tank may be reduced by releasing the ammonia through reductant input 74 to exhaust system 71 or to intake manifold 44 or through pressure relief valve 225 to second storage device 230 or some combination thereof. In particular, pressure relief valve 225 may be configured to open to relieve the vapor pressure in the storage tank under some conditions. For example, pressure relief valve 225 may open during engine/vehicle off conditions prior to, during, and/or after refilling the storage tank. In another example, pressure relief valve 225 may open at a selected pressure.

Returning to FIG. 4, ammonia may be sorbed at 450 in second storage device 230. For example, pressure relief valve 225 may be configured to open until the controller prompts the valve to close. As such, the concentration of ammonia from the storage tank may increase in second storage device 230 for at least a portion of the duration of the engine-off condition. In doing this, the vapor pressure of ammonia in the storage tank may be reduced. Lower ammonia vapor pressure in the tank may reduce ammonia release into the atmosphere. As such, ammonia sorption in second storage device 230 may reduce the amount of ammonia released into the environment at the refill valve or device when introducing the reductant to the storage tank at 460.

Then, at 470, the combustion engine is started. At 470, ammonia may be desorbed from second storage device 230 and purged into exhaust system 71 during selected engine/exhaust conditions. For example, after an engine speed run-up, and after the SCR catalyst reaches a selected operating temperature, stored ammonia may be purged into the exhaust and used to reduce NOx produced in the exhaust. In one example, at least one of the amount of purging or frequency of purging may be adjusted based on operation conditions, such as exhaust temperature, catalyst temperature, engine speed, engine load, or combinations thereof. Further, controller 12 may adjust or enable the purging of ammonia from second storage device 230 in response to various conditions. As one particular example, controller 12 may enable purging ammonia in response to a feedback signal from a temperature sensor wherein the temperature sensor may be disposed in the exhaust, the SCR catalyst downstream reductant management system 73, or the second storage device. Alternately, the temperature sensor may indicate ambient temperature. In another example, controller 12 may enable purging ammonia in response to a feedback signal from an ammonia and/or pressure sensor that may detect the concentration of ammonia stored in second storage device.

In this way, it may be possible to address vapor generation during engine-off conditions, at least under selected conditions.

Figure 5A:
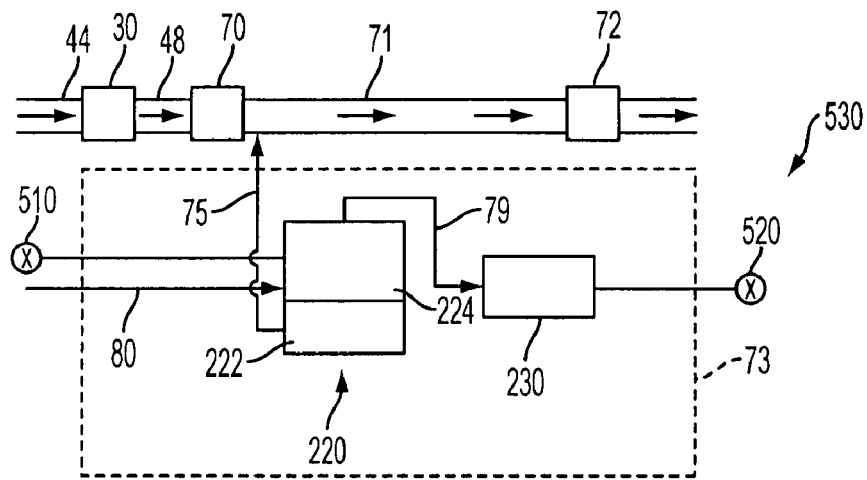
FIGS. 5A-F are schematic representations of a group of supply and storage modes for a reductant management system.

Referring now to FIGS. 5A-F, block diagrams schematically demonstrate various reductant management modes that may be used, including storing, purging, etc. For example, a mode may include selectively transporting ammonia from at least one of first storage device 220 or second storage device 230 wherein ammonia transport may be facilitated by one or more vents/connections to atmosphere. Further, the atmospheric vent may be a relief valve that may relieve pressure or vacuum build-up (or may alternative between pressure and vacuum relief based on the desired effect) or may vary in response to the desired direction of transport of ammonia and/or urea. Under some conditions, such as elevated pressure, one or more vents/connections to atmosphere may vent pressure from the system to the environment. As such, an additional device (not shown) may be disposed fluidically between the vent and the atmosphere. Specifically, as shown in FIG. 5A, reductant management system 73 may include a first atmospheric valve 510 that may be coupled to first storage device 220 (i.e. the urea storage tank) and/or a second atmospheric valve 520 that may be coupled to second storage device wherein either valve may be configured to relieve pressure or vacuum build-up or vary as described herein. The atmospheric valves may be configured to adjust the flow of atmospheric air into reductant management system 73 of FIG. 2 or to adjust the flow of vapor out of the system. It may be appreciated that reductants leaving reductant management system 73 of FIG. 2 may generally be routed intake manifold 44 or exhaust system 71 or some combination thereof.

Referring specifically to FIG. 5A, diagram 530 describes a path of reductant flow in reductant management system 73 wherein the flow may generally include the flow of ammonia vapor generated in the storage tank to second storage device 230. The path of flow described by diagram 530 may be referred to as a storage mode.

In one embodiment of storage mode described herein, NOx in the exhaust may be reduced in the SCR catalyst by liquid urea introduced to exhaust system via a first exhaust input 75 from the storage tank. The stored urea may produce ammonia vapor that may be routed to second storage device 230 wherein the ammonia vapor may be stored in second storage device 230 until controller 12 may prompt a purging condition.

In another embodiment, controller 12 may not prompt the release of a reductant from reductant management system 73. For example, during engine-off conditions, urea and/or ammonia introduced to exhaust system 71 may result in ammonia slip. As such, urea may not be introduced to exhaust system 71. However, ammonia vapor generated in the storage tank as a result of residual engine heat, for example, may be routed to second storage device. In doing so, elevated vapor pressures may be reduced, although controller 12 may not prompt the release of reductants to exhaust system 71. Further, during engine-off conditions, a reductant may be supplied to the storage tank via reductant supply channel 80. For example, a vehicle operator may refill the storage tank with urea in response to an indication that the storage tank may contain less urea than a selected amount. As such, ammonia vapor generated in the storage tank may be routed to second storage device so as to reduce ammonia vapor release into the atmosphere while the operator is refilling the tank.

It may be advantageous to facilitate the transport of ammonia from the storage tank to second storage device 230 during a storage mode. For example, atmospheric valve 520 may be configured to open. In doing this, pressure build-up in second storage device 230 may be relieved such that the air leaving reductant management system 73 may be substantially free of ammonia and more ammonia vapor may enter second storage device 230 and be stored therein. In another example, atmospheric valve 510 may be configured to open at some pressure such that atmospheric air may be drawn into the storage tank. By doing this, vacuum within the storage tank may be relieved under some conditions, such as low ammonia generation during urea supply to the exhaust system.

Figure 5B:
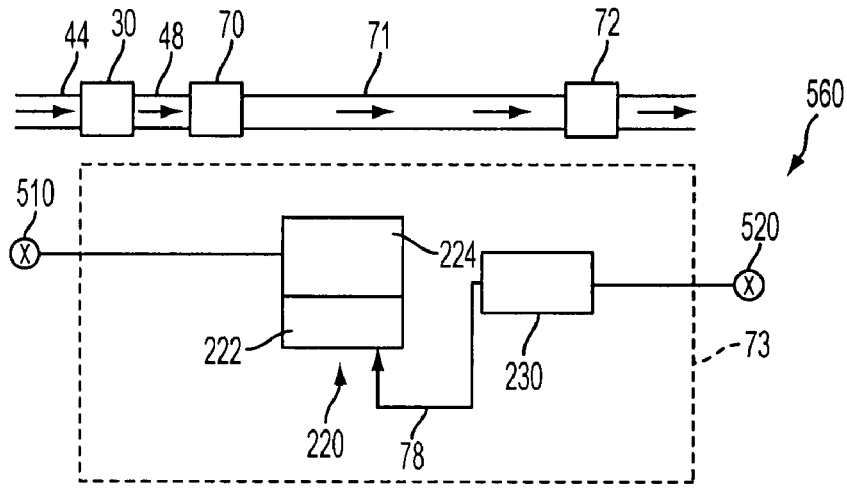
Figure 5C:
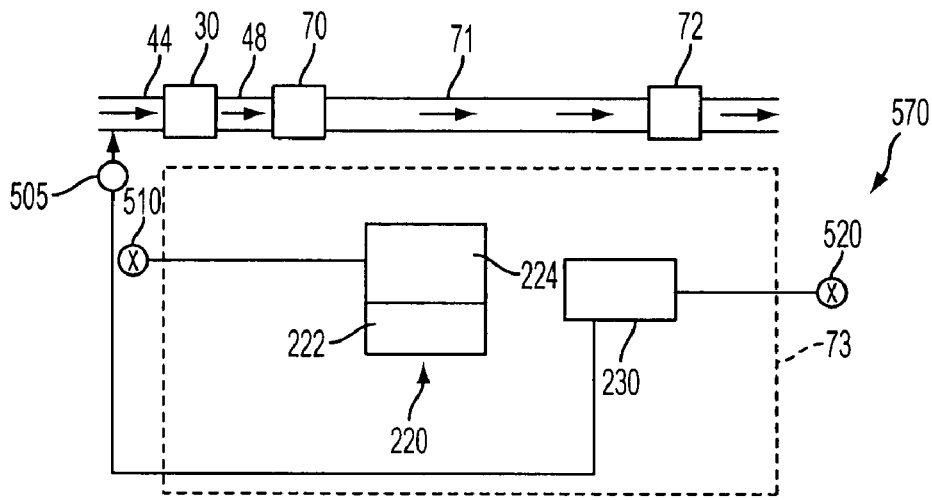
Figure 5D:
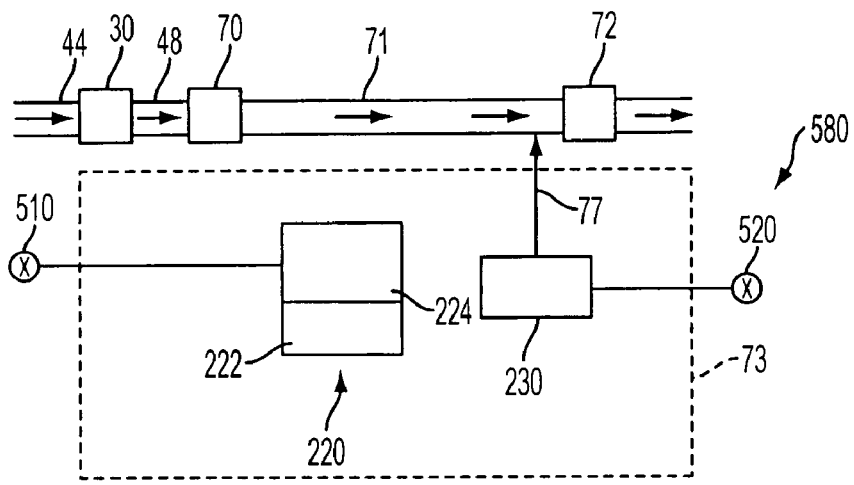

FIGS. 5B-D illustrate various modes for purging second storage device 230. In particular, ammonia purged from second storage device 230 may be introduced to the storage tank, drawn into the combustion chamber through the intake manifold, and/or released into exhaust system 71 as described herein. Further, atmospheric valve 520 may be configured to open such that atmospheric air may be introduced into second storage device 230 wherein the atmospheric air may be introduced into second storage device 230 via a pressure differential, such as a venturi device or a pump. As a result atmospheric air exiting second storage device may be at least partially saturated with ammonia vapor that may be dissolved in the urea solution or may reduce NOx produced by the combustion reaction of the engine.

In some embodiments, the release of ammonia from second storage device 230 may be facilitated by heating the atmospheric air prior to introducing the air. For example, emission control system 200 may include a heating device (not shown) that may be disposed between atmospheric valve 520 and second storage device 230. In another example, emission control system 200 may route a portion of the hot exhaust such that the atmospheric air may be preheated.

Referring specifically to FIG. 5B, diagram 560 describes a mode of purging second storage device that may generally include the flow of ammonia vapor stored in second storage device 230 to the storage tank such that ammonia may be dissolved in the urea solution. In one embodiment, the flow of ammonia vapor may be facilitated by drawing atmospheric air through atmospheric valve 520 via a pump. For example, a pump that may be disposed along channel 78 may route atmospheric air drawn into the reductant management system through valve 520 to the storage tank where the ammonia may be dissolved into the urea solution. However, the urea solution in the storage tank may become saturated with dissolved ammonia causing elevated ammonia vapor pressures within the tank. As such, the operation mode described by diagram 560 may be ended so that vapors may again be stored in 230 based on pressure in 200. Also, the storage tank may preferentially be relieved by at least temporarily routing the vapor to second storage device 230 according to diagram 530 and/or releasing ammonia from the storage tank according to the modes described by diagram 590 and diagram 595.

Referring specifically to FIG. 5C, diagram 570 describes storage device purging operation with a flow path of reductants in reductant management system 73, where the flow may generally include the flow of ammonia vapor stored in second storage device 230 to intake manifold 44 upstream combustion chamber 30. Valve 505 may be configured to open such that ammonia vapor may be selectively drawn into combustion chamber 30 to reduce NOx upstream of the catalytic converters or reduce NOx in catalytic converter 70 or in SCR catalyst 72 or some combination thereof.

During ammonia purge from the reductant management system, urea in the storage tank may generate ammonia causing elevated ammonia vapor pressures within the tank. As such, purging operation may be ended so that vapors may again be stored in 230 based on pressure in 200. Also, the storage tank may preferentially be relieved by at least temporarily routing the vapor to second storage device 230 according to diagram 530 and/or releasing ammonia from the reductant management system as described herein.

Referring specifically to FIG. 5D, diagram 580 describes storage device purging operation with a flow path of reductants in reductant management system 73, where the flow may generally include the flow of ammonia vapor stored in second storage device 230 to exhaust system 71. Again, atmospheric valve 520 may be configured to open such that atmospheric air may be introduced into second storage device 230 wherein the atmospheric air may be introduced into second storage device 230 via a pressure differential, such as a venturi device at the entry point of ammonia vapor into exhaust system 71 or a pump.

Figure 5E:
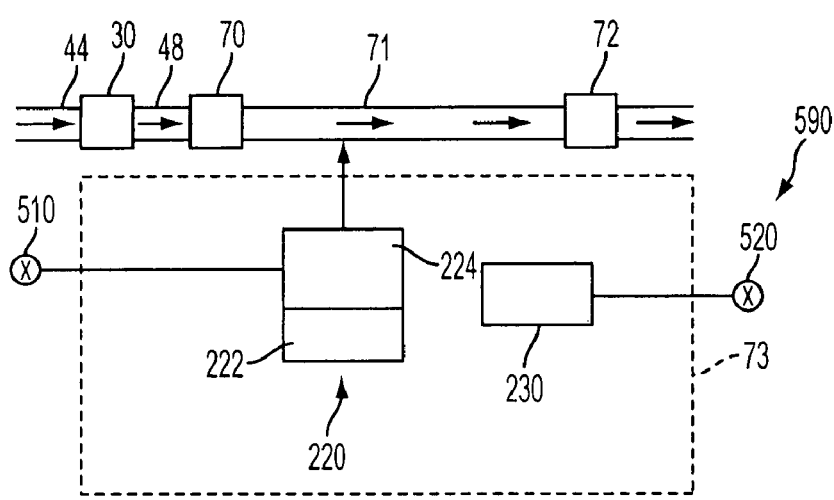

Referring now specifically to FIG. 5E, diagram 590 describes a storage tank purge with a reductant flow path in reductant management system 73 where the flow may generally include the flow of ammonia vapor stored in the storage tank to exhaust system 71. Specifically, atmospheric valve 510 may be configured to open such that atmospheric air may be introduced into the storage tank to relieve vacuum caused by the release of ammonia from the storage tank to exhaust system 71 for the selective and catalytic reduction of NOx or due to temperature changes.

Figure 5F:
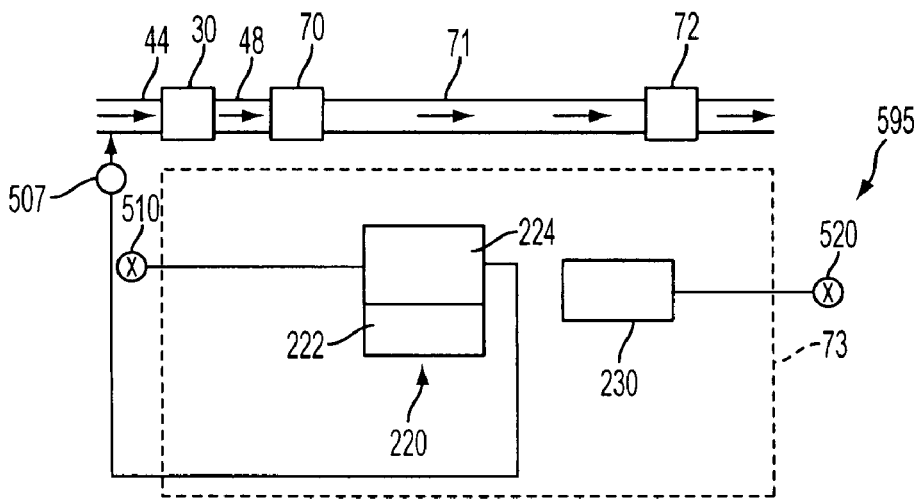

Referring specifically to FIG. 5F, diagram 595 describes a storage tank purge with a reductant flow path in reductant management system 73 where the flow may generally include the flow of ammonia vapor stored in the storage tank to intake manifold 44 upstream combustion chamber 30. Valve 507 may be configured to open such that ammonia vapor may be selectively drawn into combustion chamber 30 to non-catalytically reduce NOx upstream the catalytic converters or reduce NOx in catalytic converter 70 or in SCR catalyst 72 or some combination thereof. The addition of urea and ammonia (or any other suitable reductant) to an engine and/or exhaust system as disclosed herein may be performed in a variety of manners. For example, controller 12 may include executable code to control the addition of suitable amounts of reductants to an engine and/or exhaust system via any suitable system components, including but not limited to valves, pumps, injectors, etc.

In some embodiments the system may be configured to control the amounts added in response to feedback control. For example, in some embodiments, controller 12 may adjust amounts of the first reductant and the second reductant added to the exhaust system based upon feedback received from sensor 124. In some embodiments, sensor 124 may be an ammonia sensor. In other embodiments, controller 12 may adjust amounts of the reductants based upon feedback from sensor 122 where sensor 122 may be a NOx sensor 640, for example. Further, in yet other embodiments, both an ammonia sensor and a NOx sensor may be employed, along with any other suitable sensor or sensors. In yet other embodiments, controller 12 may be configured to determine concentrations of NOx based upon engine operating conditions, and/or may be configured to estimate a concentration of ammonia added to the exhaust system from second storage device 230 based upon variables such as a flow rate of air through the second storage device, etc.

Figure 6:
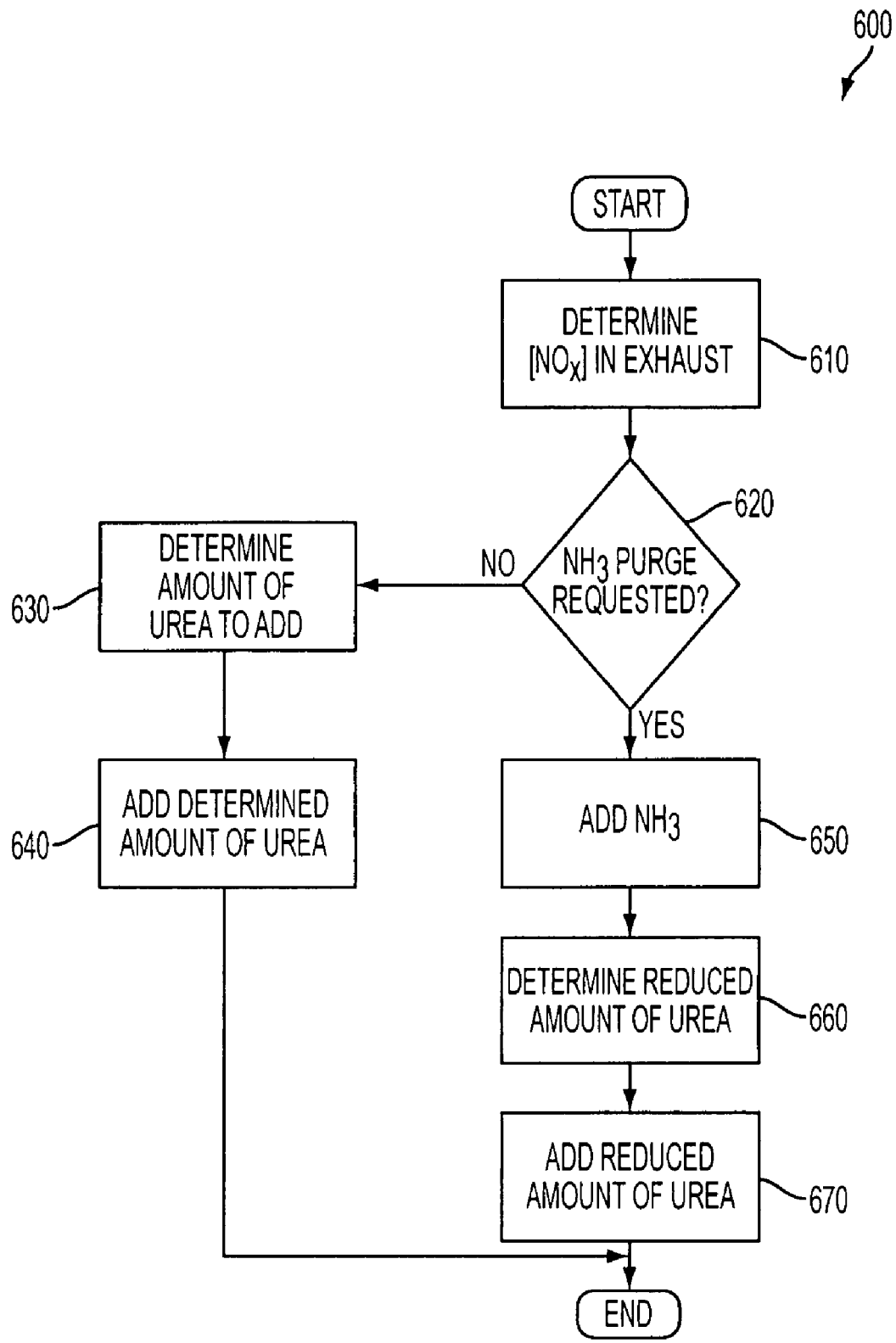
FIG. 6 describes a flow diagram of an exemplary embodiment of a method of determining the amount of a reductant agent to be added to reduction process based on the amount of another reductant agent introduced.

Referring now to FIG. 6, one exemplary embodiment of a method 600 for managing the addition of a plurality of reductants to an exhaust system is shown. Method 600 may be implemented in a variety of ways, for example, in some embodiments method 600 may be implemented by the execution of code stored on controller 12.

Method 600 first includes determining, at 610, a concentration of NOx in the exhaust gases in exhaust system 71.

Examples for determining the NOx concentration include, but are not limited to, receiving a signal from a NOx sensor, and/or determining an estimated NOx concentration from engine operating conditions such as speed and load. Further, the amount of NOx may be estimated in various forms, such as a level of NOx, a NOx concentration, and/or a NOx rate mass per volume of flow.

Next, method 600 includes determining, at 620, whether an ammonia purge from second storage device 230 is requested. Various conditions or events may be used to determine when to request an ammonia purge. Examples include, but are not limited to, requesting a purge when a pressure of ammonia in second storage device 230 exceeds a threshold pressure, requesting a purge after a predetermined engine operating interval (for example, a time interval or a number of engine cycles), requesting a purge when engine operating conditions provide an opportunity to purge, and/or requesting a purge when an amount of reductant stored in 230 reaches a predetermined level, etc.

If no ammonia purge is requested, then method 600 proceeds to 630 where an amount of urea to add to the exhaust is determined, and then to 640 where the determined amount of urea is added to the exhaust via 75, for example. An amount of urea to add to the exhaust may be determined in a variety of ways. In some embodiments, controller 12 may receive an input from a NOx sensor indicating a concentration of NOx in the exhaust gases, and controller 12 may then determine and/or adjust from this input an amount of urea to add to the exhaust. In other embodiments, a concentration of NOx in the exhaust may be estimated from engine operating conditions, and a correlating amount of urea may be added to the exhaust system. In yet other embodiments, urea may be added to the exhaust system at a constant rate. The amount of ammonia to be added for a selected sensor input or engine operating condition may be calculated, or may be predetermined and stored in a look-up table on controller 12 and adjusted based on input operating conditions.

On the other hand, if an ammonia purge is requested, then method 600 proceeds to 650, at which ammonia is added to the exhaust system and a purge is performed. In some embodiments, controller 12 may control or adjust the rate of ammonia addition to the exhaust system, for example, by controlling a flow of ammonia into the exhaust system based on sensor 124. Alternatively, ammonia may be added at a preselected rate.

As described above, in some embodiments, ammonia may be added to the exhaust system exclusive of any urea. In other embodiments, ammonia from the second storage device may be added to the exhaust system simultaneously with urea. Where ammonia from the second storage device is added to the exhaust system simultaneously with urea, method 600 may include determining and/or providing, at 660, a reduced amount of urea added to the exhaust system to accommodate the added ammonia while avoiding ammonia slip, and then adding the determined amount of urea to the exhaust system at 670.

The reduced amount of urea to be added to the exhaust system may be determined in a variety of ways. For example, controller 12 may determine the reduced amount of urea to be added to the exhaust by determining an amount or concentration of ammonia added to the exhaust system and also determining an amount or concentration of NOx in the exhaust gases from engine 10, and then determining how much urea to add to completely reduce all NOx in the exhaust gases. The amount of urea to add may be calculated from a function or functions derived from the NOx reduction reaction stoichiometries, or may be determined via a look-up table stored on controller 12. In this way, the amount of urea to be added to the exhaust may be adjusted in response to variation in an amount or concentration of ammonia added to the exhaust system, and/or variation in an amount or concentration of NOx in the exhaust gases from engine 10.

Reductant management system 73 may selectively introduce reductants upstream, at, and/or downstream of combustion chamber 30 before entering SCR catalyst 72. In particular, controller 12 may prompt an ammonia purge based on various conditions. For example, controller 12 may prompt storage device to purge in response to the ammonia concentration in second storage device 230. As such, ammonia may be introduced to intake manifold 44 and/or exhaust system 71 to reduce NOx. Alternately, ammonia may be routed to the storage tank to be dissolved in the urea solution. Ammonia may be introduced to various regions of the system, such as to the storage tank, intake manifold, and/or the exhaust system based on a variety of conditions, including exhaust temperature, engine combustion temperature, etc.

Figure 7:
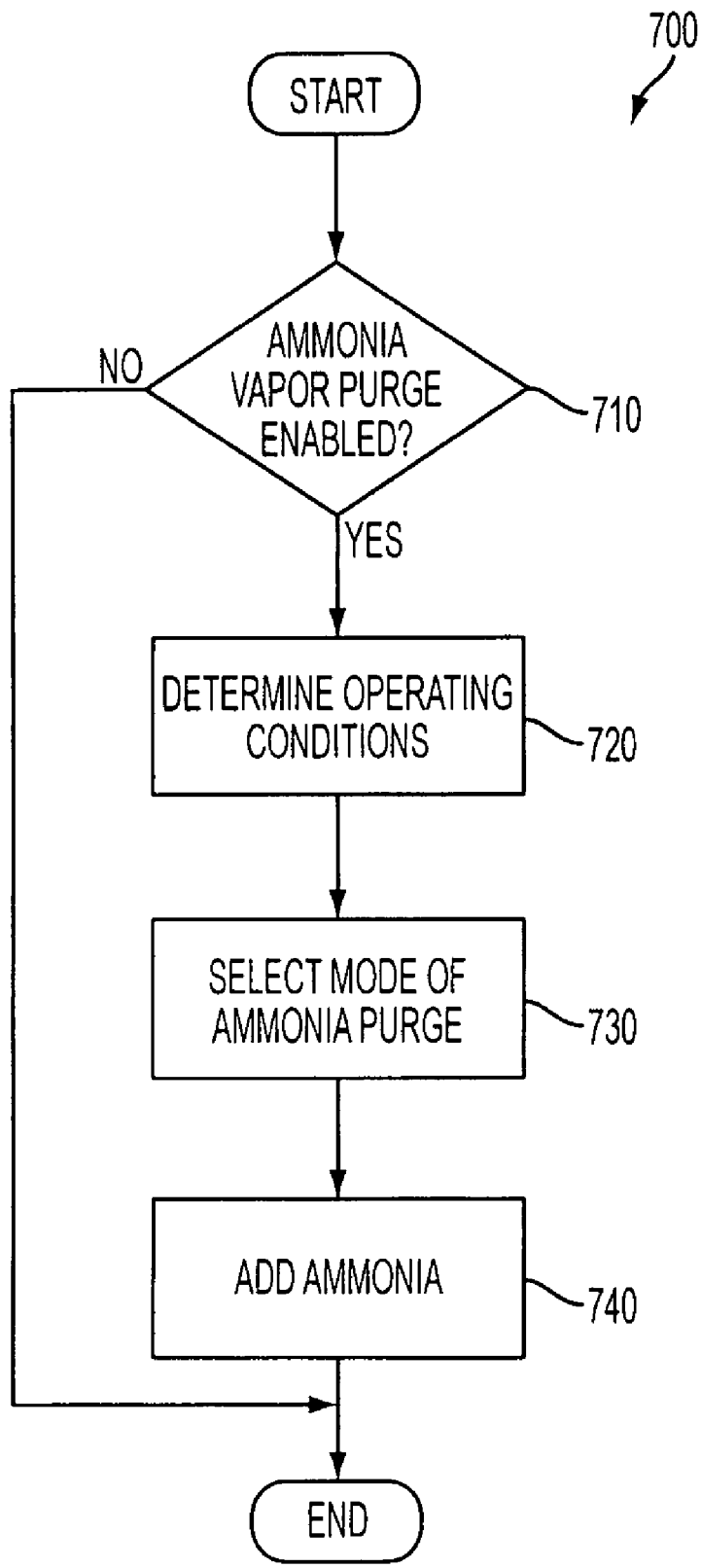
FIG. 7 describes another flow diagram of an exemplary embodiment of a method of selecting from a plurality of locations to introduce a reductant agent based on various conditions.

FIG. 7 is another flowchart 700 of an embodiment that illustrates controlling the region where ammonia may be introduced based on various conditions, such as temperature. As such, controller 12 may determine if an ammonia purge may be enabled at 710, otherwise the routine ends. An ammonia purge may be enabled in response to various feedback signals from controller 12 as described herein.

Next, method 700 includes determining, at 720, various conditions in order to select a mode of ammonia purge at 730. In some embodiments, exhaust temperature may be used. In particular, an output signal from one or more temperature sensors, or temperature estimates, may identify the temperature at various regions of the system. For example, the operating temperature of the combustion chamber may be identified. In another example, the exhaust temperature may be identified. In yet another example, the temperature of the urea storage tank may be identified. In other embodiments, operating conditions of engine 10 may be identified, such as engine speed and/or load. Under some conditions, such as at various engine speeds or loads, ammonia may not be injected to combustion chamber 30

Accordingly, at 730, a mode of ammonia purge may be selected based on various conditions as described herein. In one embodiment, the temperature of combustion chamber 30 may be in a range of temperatures such that ammonia may reduce NOx in the combustion chamber. For example, controller 12 may prompt an ammonia purge from second storage device 230 to intake manifold 44 in response to an output signal from a temperature sensor in combustion chamber 30 where the temperature may indicate conditions suitable for non-catalytic reduction of NOx by ammonia. In another embodiment, the temperature in SCR catalyst 72 may be suitable for high NOx conversion therein. For example, controller 12 may prompt an ammonia purge to exhaust system 71 in response to an output signal from a temperature sensor in SCR catalyst 72. In yet another embodiment, various conditions in the urea storage tank may be suitable to dissolve ammonia into the aqueous urea solution. For example, the storage tank may reach relatively cool temperatures at some time after an engine shutdown such that ammonia purged from second storage tank 230 may be substantially dissolved in the urea solution. In another example, controller 12 may prompt an ammonia purge to the storage take in response to an output signal from a concentration sensor indicating a concentration of the urea solution suitable for high solubility of ammonia.

In this way, it may be possible to control reductant addition to the exhaust during a variety of conditions, and manage purging of ammonia vapors along with separate reductant delivery to achieved improved NOx reduction and reduce ammonia slip.

The invention claimed is:

1. A method of managing vapors generated from an ammonia-containing reductant delivery system for an engine, comprising:
   storing an ammonia-containing fluid in a first storage device;
   generating ammonia vapors in the first storage device and storing said generated ammonia vapors in a second storage device;
   purging said stored vapors from the second storage device to upstream of a combustion chamber of the engine during a first condition and downstream of the combustion chamber during a second condition; and
   adjusting an amount of reductant injection from the first storage device to compensate for said purging of said vapors.

2. The method of claim 1 wherein the first condition is at least one of an atmospheric temperature condition or a storage temperature condition.

3. The method of claim 1 wherein said generated ammonia vapors are stored in the second storage device during at least a portion of refilling the first storage device with an ammonia containing fluid.

4. The method of claim 1 further comprising purging said generated ammonia vapors from the first storage device to at least one of upstream of a combustion chamber of the engine or downstream of the combustion chamber.

5. The method of claim 1 wherein said stored vapors are purged downstream of the combustion chamber into an exhaust of the engine to react in a catalyst, where said catalyst is an SCR catalyst.

6. The method of claim 1 wherein at least one of said first and second storage devices is vented to atmosphere.

7. The method of claim 1 wherein the first condition is a first temperature condition and the second condition is a second temperature condition.

8. The method of claim 7 wherein the first temperature condition is greater than the second temperature condition.

9. The method of claim 7 further comprising purging said stored vapors from the second storage device to the first storage device during a third temperature condition wherein the third temperature condition is less than the first temperature condition and the second temperature condition.

10. A method of purging ammonia-containing vapors for an engine, comprising:
    storing an ammonia-containing fluid in a first storage device;
    generating ammonia vapors in the first storage device and storing said generated ammonia vapors in a second storage device;
    delivering said ammonia-containing vapors to a first region upstream of an engine combustion chamber during a first condition and a second, different, region during a second condition, the first region being the first storage device.

11. The method of claim 10 wherein the second region is downstream of said combustion chamber.

12. The method of claim 10 wherein the first condition is a first temperature condition and the second condition is a second temperature condition.

13. The method of claim 12 wherein the first temperature condition is greater than the second temperature condition.

14. A method of refilling an ammonia-containing reductant delivery system for an engine of a vehicle, comprising:
    storing an ammonia-containing fluid in a first storage device;
    during at least a portion of refilling the first storage device with an ammonia-containing fluid, storing ammonia vapors generated from said refilling in a second storage device; and
    after said storing, purging said stored ammonia vapors to the first storage device based on a temperature condition.

15. The method of claim 14 where said stored ammonia vapors are purged during engine-off conditions.

16. The method of claim 14 where said stored ammonia vapors are purged during engine-on conditions.

17. A method of refilling an ammonia-containing reductant delivery system for an engine of a vehicle, comprising:
    storing an ammonia-containing fluid in a first storage device;
    during at least a portion of refilling the first storage device with an ammonia-containing fluid, storing ammonia vapors generated from said refilling in a second storage device;
    after said storing, purging said stored ammonia;
    where said stored ammonia is purged into the first storage device during at least a first condition;
    where said stored ammonia is purged into an exhaust of the engine to react in an SCR catalyst during at least a second condition;
    where said stored ammonia is purged into a region upstream a combustion chamber of the engine during at least a third condition; and
    adjusting an amount of injected reductant from the first storage device during said purging based on said purging operation, where said injected reductant from the first storage device is urea.

* * * * *